United States Patent [19]
Hasegawa et al.

[11] Patent Number: 5,160,564
[45] Date of Patent: Nov. 3, 1992

[54] PROCESS FOR PRODUCING A THERMAL STENCIL MASTER SHEET FOR STENCIL PRINTING

[75] Inventors: Takanori Hasegawa; Shoichi Ikejima, both of Tokyo, Japan

[73] Assignee: Riso Kagaku Corporation, Tokyo, Japan

[21] Appl. No.: 215,548

[22] Filed: Jul. 6, 1988

[30] Foreign Application Priority Data

Jul. 7, 1987 [JP] Japan .................. 62-169529

[51] Int. Cl.⁵ .................. B29B 17/00; B29C 47/02
[52] U.S. Cl. .................. 156/231; 156/238; 156/244.24; 156/289; 264/213
[58] Field of Search .............. 156/230, 231, 232, 238, 156/246, 247, 249, 289, 344, 244.11, 244.27, 244.24; 264/213, 257, 271.1, 279, 300, 313; 428/202, 211, 913; 427/155, 394, 395, 154, 156

[56] References Cited
U.S. PATENT DOCUMENTS

| | | | |
|---|---|---|---|
| 2,000,347 | 5/1935 | Murray | 156/231 |
| 2,071,035 | 2/1937 | Jenett | 156/231 |
| 3,901,702 | 8/1975 | Sankus, Jr. et al. | 427/154 |
| 4,657,783 | 4/1987 | Tatt et al. | 427/395 |
| 4,789,413 | 12/1988 | Tani et al. | 156/289 |
| 4,798,646 | 1/1989 | Sumi | 156/344 |
| 4,837,088 | 6/1989 | Freedman | 156/247 |

Primary Examiner—Michael W. Ball
Assistant Examiner—Mark A. Osele
Attorney, Agent, or Firm—Fay, Sharpe, Beall, Fagan, Minnich & McKee

[57] ABSTRACT

A process for producing a thermal stencil master sheet for stencil printing, which sheet, even when a thermoplastic film affording superior perforation properties but having low mechanical strengths is used therefor, can prevent the film from being broken to thereby improve its productivity is provided, which process comprises a step of laminating thermoplastic films onto both the surfaces of a base film, a step of bonding porous substrates onto the thermoplastic films and a step of stripping the thermoplastic films bonded to the porous substrates from the base film.

10 Claims, 5 Drawing Sheets

PROCESS FOR PRODUCING A THERMAL STENCIL MASTER SHEET FOR STENCIL PRINTING

BACKGROUND OF THE INVENTION

1. Field of the Invention

This invention relates to a process for producing a thermal stencil master sheet for stencil printing. More particularly it relates to a process for producing a thermal stencil master sheet having improved perforation properties.

2. Description of the Related Art

There has been known a thermal stencil master sheet obtained by laminating a thermoplastic resin film onto a porous substrate such as a porous thin paper and further providing a release agent layer on the surface of the film for preventing melt-adhesion of the film to a manuscript or a thermal head. In the case where stencil making is carried out using such a thermal stencil master sheet a manuscript is closely attached onto the surface of the film of the stencil master sheet, followed by irradiating infrared rays or a xenon flash light thereto from the side of the perforated substrate of the thermal stencil master sheet to generate heat at the black image part of the manuscript, melt-perforating the film of the thermal stencil master sheet by the generated heat and thereafter stripping the manuscript from said stencil master sheet. Alternatively, the image of a manuscript is read by an image sensor, followed by melt-perforating the film of said stencil master sheet by the heat of thermal head just as the image is.

For improvement of the perforation properties of the thermal stencil master sheet, a process of making the material of the thermoplastic film easy to be perforated by heat and a process of making the thermoplastic film thinner have been proposed.

However, when such processes are employed, a problem has been raised that the mechanical strengths such as tensile strength of the thermoplastic film itself are reduced so that it is liable to be broken when it is laminated on the porous substrate, for example.

SUMMARY OF THE INVENTION

The object of the present invention is to provide a process for producing a thermal stencil master sheet, which sheet, even when a thermoplastic film affording superior perforation properties but having low mechanical strengths is used therefor, can prevent the film from being broken to thereby improve its productivity.

The present invention resides in;

a process for producing a thermal stencil master sheet, which process comprises a step of laminating thermoplastic films onto both the surfaces of a base film, a step of bonding porous substrates onto said thermoplastic films, and a step of stripping said thermoplastic films bonded to said porous substrates from said base film.

DETAILED DESCRIPTION OF PREFERRED EMBODIMENTS

Figure 1:
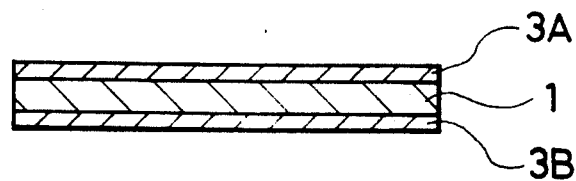
FIGS. 1, 2 and 3 show cross-sectional views illustrating an embodiment of the production steps of the thermal stencil master sheet of the present invention.
Figure 2:
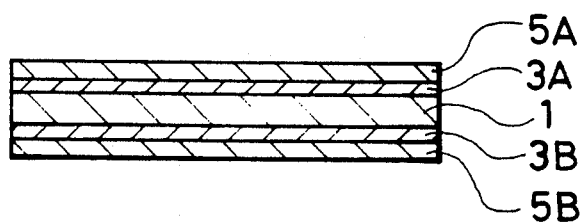

The production steps of the present invention comprise a step of laminating thermoplastic films 3A and 3B onto both the surfaces of a base film 1 shown in FIG. 1, a step of bonding porous substrates 5A and 5B onto the thermoplastic films 3A and 3B, respectively shown in FIG. 2, and a step of stripping the thermoplastic films 3A and 3B bonded onto the porous substrates 5A and 5B from the base film 1.

In the present invention, lamination of the thermoplastic films (or heat-sensitive films) 3A and 3B onto the base film 1 is carried out by feeding these materials to a co-extrusion processing means to form a laminated film, and if necessary, subjecting it to biaxial stretching, or by laminating the thermoplastic films 3A and 3B onto the base film so that the former films can be stripped from the latter film. As the co-extrusion processing method, known processes such as inflation process co-extrusion molding, T-die process co-extrusion molding, co-extrusion coating, etc. may be employed.

Examples of the materials for the thermoplastic films 3A and 3B are made of thermoplastic resins such as polyesters, polycarbonates, polyethylene, polypropylene, polyamides, polyvinyl chloride, polyvinylidene chloride, vinylidene chloride-vinyl chloride copolymer, polyvinyl alcohol, polystyrene, polyamide, polyacetal etc. The thickness of the films 3A and 3B are preferred to be in the range of 0.5 to 10μ, particularly 0.5 to 5μ.

Figure 3:
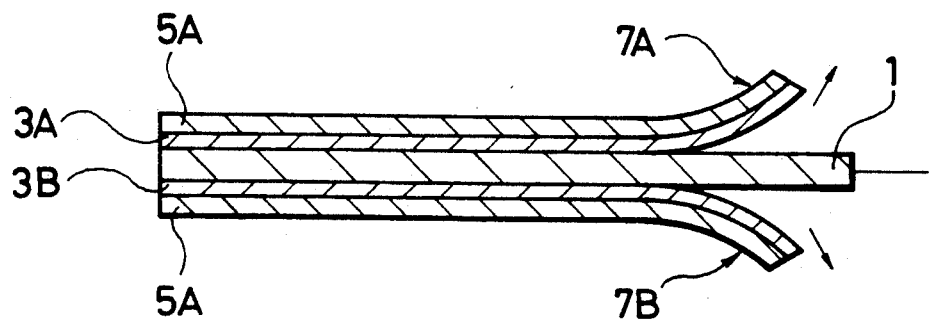

The material for the base film 1 has no particular limitation, but those which are thermoplastic resins but different from those used for the thermoplastic films are preferred. Further, the base film 1 is preferred to have a known release agent blended therewith for improving stripping properties, for example, compounds generally known as lubricants such as aliphatic hydrocarbons (paraffin, wax, etc.), higher aliphatic alcohols, fatty acids or esters thereof, metal soaps, fluorine compounds, etc., and silicone release agents disclosed in Japanese patent application laid-open No. Sho 61-40196/1986, Japanese patent application No. Sho 61-13496/1986, etc. The preferred quantity of these materials blended is in the range of 0.1 to 10% by weight, preferably 0.5 to 4% by weight in the base film. By adjusting the quantity thereof blended, it is possible to omit a step of coating a release agent onto the thermoplastic film after preparation of the thermal stencil master sheet. This is because, when the thermoplastic films bonded onto the porous substrates are stripped from the base film in the step shown in FIG. 3, the release agent blended in the base film is transferred onto the respective surfaces of the thermoplastic films. The thickness of the base film may be a thickness enough to reinforce the thermoplastic films, so as not to be broken in the processing, and it is preferably for example in the range of 2 to 50μ.

Examples of adhesives used for bonding the porous substrates 5A and 5B onto the thermoplastic films are vinyl acetate adhesives, acrylic adhesives, polyester adhesives, urethane adhesives, epoxy adhesives, EVA adhesives, etc.

In order to strip the respective thermal stencil master sheets 7A and 7B from the base film 1 along the respective surfaces of the thermoplastic films 3A and 3B, the thermal stencil master sheets are stripped from the base film 1 at the end part of the laminated film obtained in FIG. 2, followed by connecting the separated thermal stencil master sheets 7A and 7B to a suitable take-up means such as wind-up roll and drawing them in the drawing directions different from that of the base film, for example in the direction of 30° to 60° above or below a horizontal direction in the case where the drawing direction of the base film is horizontal.

The porous substrates 5A and 5B may be those which substantially do not melt at the time of perforating the thermoplastic films and are porous materials through which inks pass at the time of printing. Preferred examples thereof are thin paper or non-woven fabric of natural fibers such as manila hemp, Kozo (paper mulberry), Mitsumata (Edgeworthia papyriferd), pulp, etc., or synthetic fibers of polyesters, polyvinyl alcohol, polyamide, etc., alone or in admixture thereof, and further, screen plain gauzes of polyester fibers, silk, etc.

The above-mentioned release agent may be applied onto the surfaces of the thermoplastic films of the thermal stencil master sheet, but by having the release agent contained in the base film as described above, it is possible to transfer the agent onto the thermoplastic films and thereby the release agent-applying process becomes unnecessary.

Figure 4:
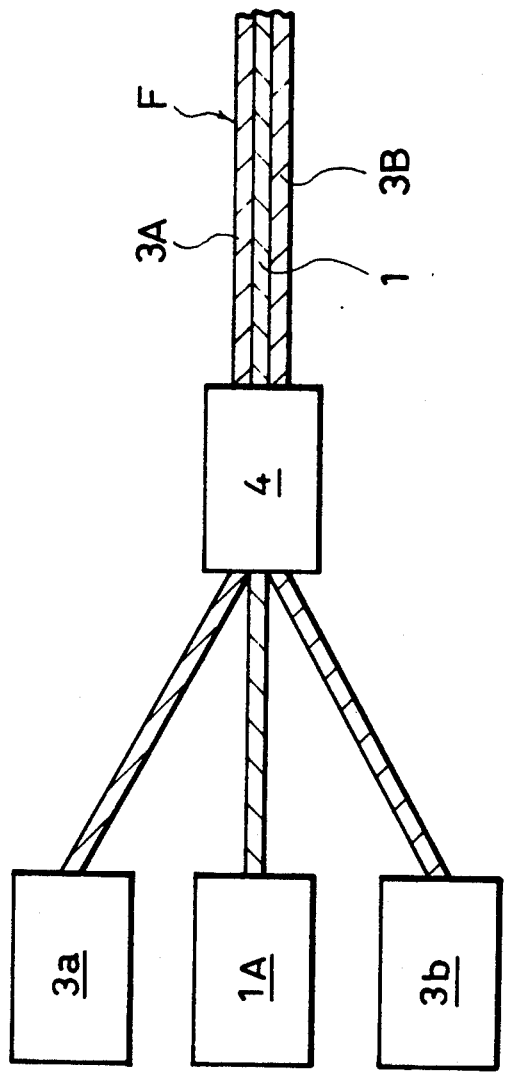
FIG. 4 shows a block diagram illustrating the production process of the laminated film of the present invention according to a co-extrusion processing process.

FIG. 4 shows a block diagram illustrating the production process of the laminated film F of the present invention according to a co-extrusion processing process. In this figure, a powdery or granular raw material 1A for a base film including a release agent blended therein and sufficiently mixed therewith in advance is fed into a co-extrusion molding apparatus 4. Similarly, a raw material 3a, 3b for thermoplastic films 3A and 3B are also fed into the co-extrusion molding apparatus 4, respectively. In this co-extrusion molding apparatus 4, the raw materials 1A, 3a and 3b are gradually melted, extruded and joined into a three-ply film upstream of a die, inside the die or outside the die. As the die, a T-die or an inflation die is employed and if the joining is carried out outside the die, the film having left the die can be subjected to corona discharge or the like to fusion bond the films to one another. The film thickness is determined by the draft ratio or draw ratio in the longitudinal direction and the lateral direction.

Figure 5:
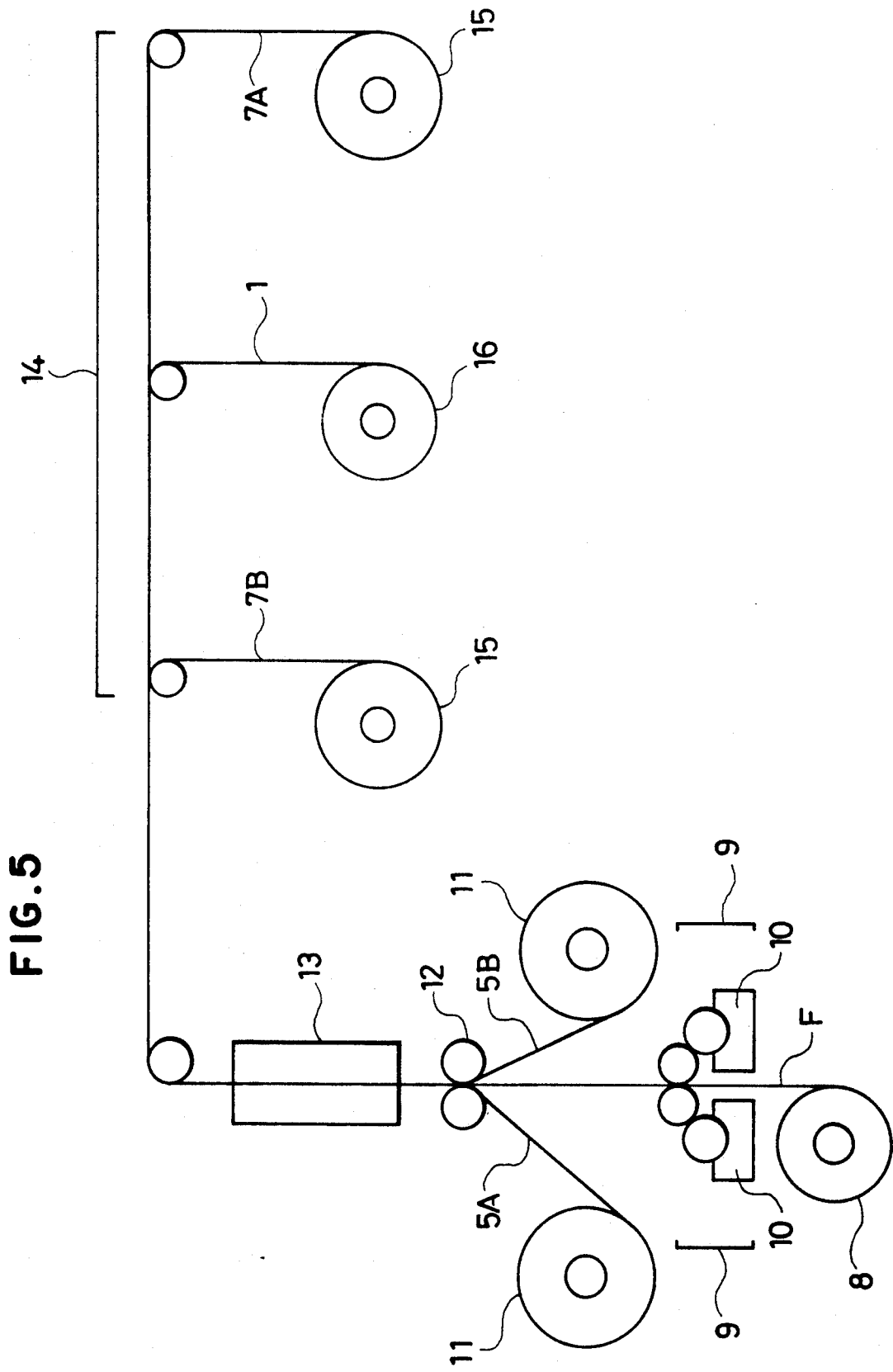
FIG. 5 and FIG. 6 each show an embodiment of the process for producing the thermal stencil master sheet of the present invention.
Figure 6:
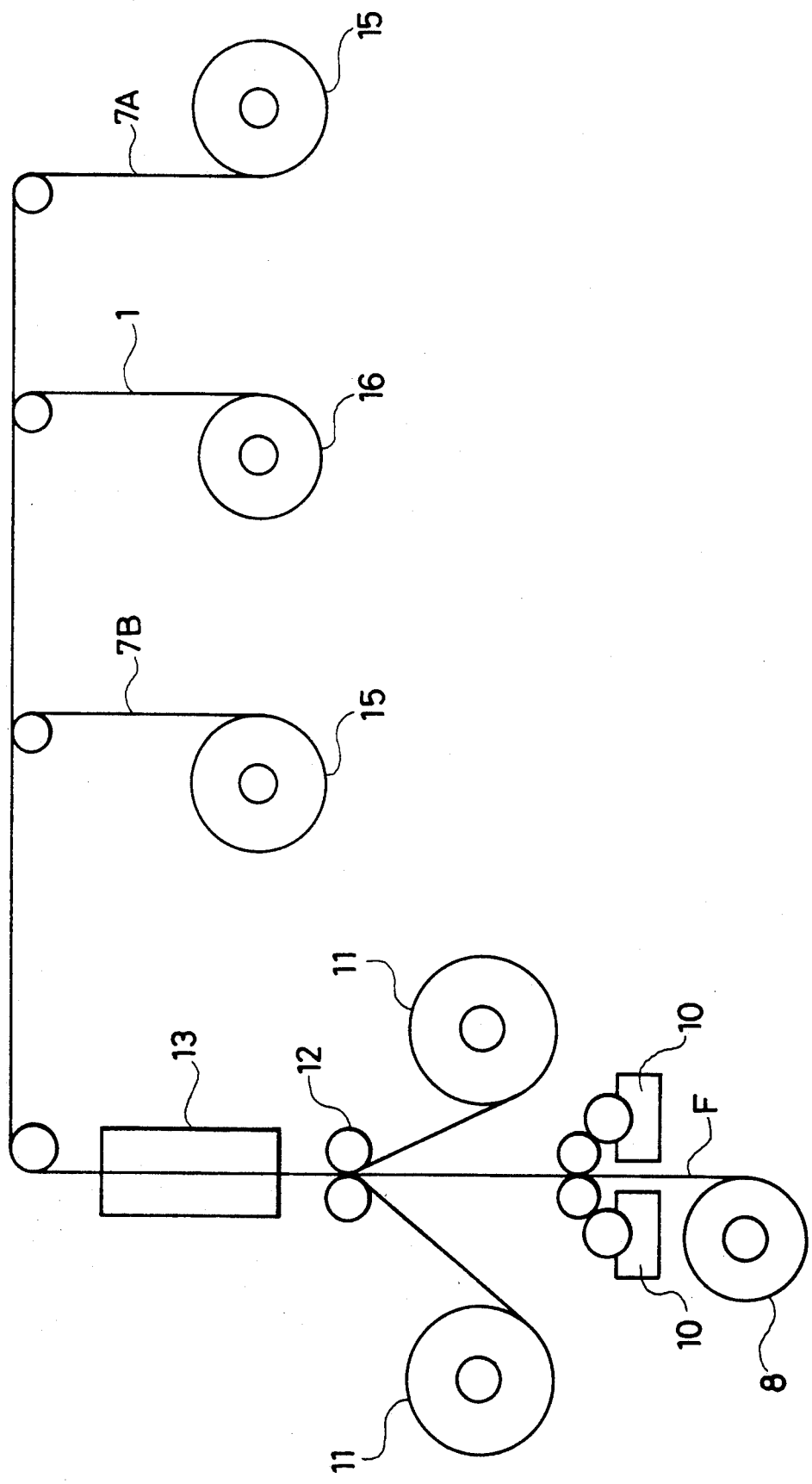

FIG. 5 and FIG. 6 each show an embodiment of the process for producing the thermal stencil master sheet. In these figures, the laminated film F drawn from the roll thereof 8 is coated with an adhesive 10 of ultraviolet light-cured type, for example, on both the surfaces thereof, that is on the thermoplastic films 3A and 3B thereof, at an adhesive-coating part 9 provided with a roll coater or the like, and further, porous substrates 5A and 5B fed from the rolls thereof 11 are respectively contact-bonded onto the thermoplastic films 3A and 3B at a superposing and laminating part 12 (by means of rolls), followed by irradiating the resulting laminate by ultraviolet light by means of an ultraviolet light-irradiating means 13 to enhance the lamination strength of the laminate. The cross-section of the thus obtained film is shown in FIG. 2. The film is then subjected to peeling of the thermal stencil master sheets 7A and 7B from the base film 1 and wind-up thereof at a peeling and wind-up part 14 to obtain the respective rolls of the thermal stencil master sheets 15 and a roll of the base film 16. The rolls of thermal stencil master sheet 15 are cut into a suitable size and fabricated to obtain the objective product. In addition, if a solvent type adhesive is used as the above-mentioned adhesive 10, a dryer is employed in place of the above-mentioned ultraviolet light-irradiating means 13.

The wind-up direction of the thermal stencil master sheet has no particular limitation, but, as shown in FIG. 5, if the stencil master sheet 7A is wound up so that the thermoplastic film can be present on the inner side of the sheet and the stencil master sheet 7B is wound up so that the thermoplastic film can be present on the outer side of the sheet, then the sheet 7A can be distinguished from the sheet 7B by naked eyes; hence at the time of occurrence of troubles, it is easy to pursue the cause thereof and deal therewith. Further, when the stencil master sheets are used for different use applications, from each other, it is possible to prevent confusion with each other so that marking or the like is unnecessary.

On the other hand, as shown in FIG. 6, if the wind-up directions of the thermal stencil master sheets 7A and 7B are the same, that is, the surfaces of the thermoplastic films are both present on the inner side of the stencil master sheets, then the feeding directions of the stencil master sheets at the time of fabrication thereof are the same; hence a uniform operation is possible to thereby improve productivity. In addition, if the stencil master sheets are wound up so that the thermoplastic films can be present on the other side thereof, dusts may be attached onto the surface of the films, but the sheets are not easily affected by moisture. On the other hand, if the porous substrates are made present on the outer side of the stencil master sheets, there is a reverse tendency to the above. Thus, it is preferred to determine the wind-up direction, taking into account the storage environment of the film and the properties of the objective thermal stencil master sheet.

Figure 7:
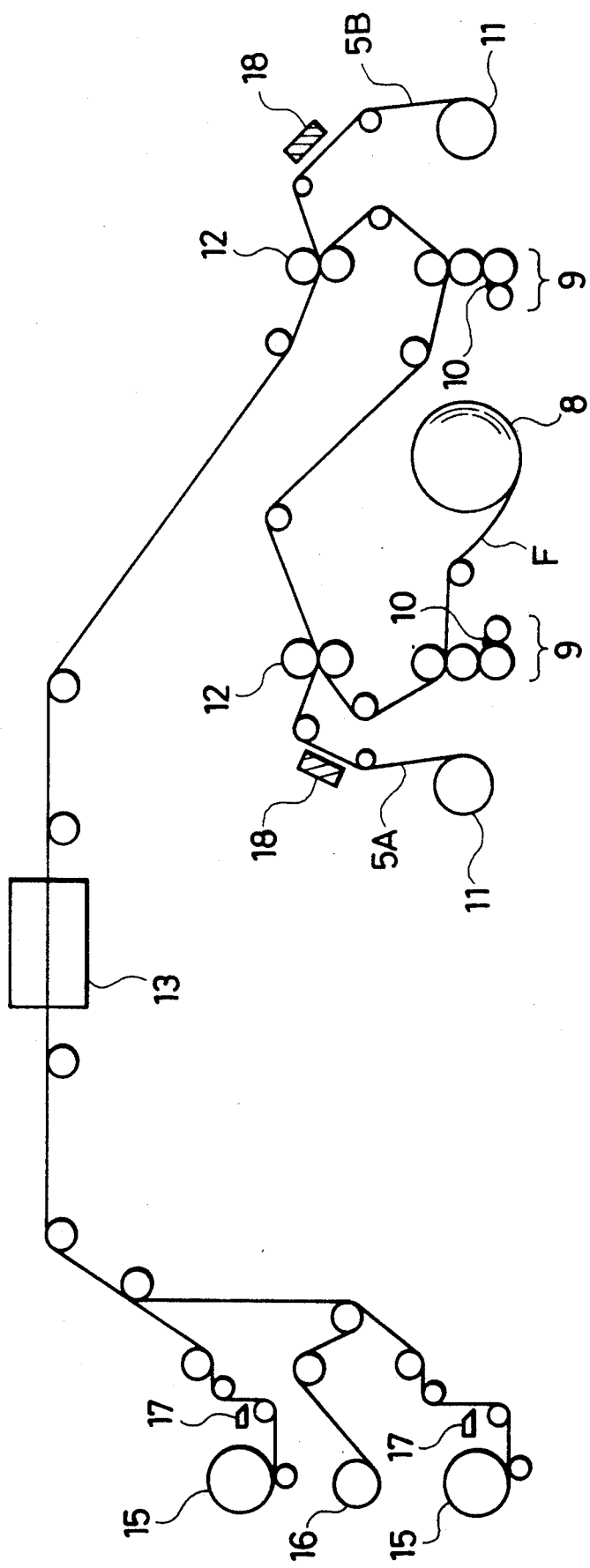
FIG. 7 shows another embodiment of the process for producing the thermal stencil master sheet of the present invention.

FIG. 7 shows another embodiment of the process for producing the thermal stencil master sheet of the present invention. In the apparatus of this figure, the porous substrates 5A and 5B are stepwise adhered onto each of the surfaces of the laminated film 8. Further, a cutter 17 is provided in front of the roll 15 and the thermal stencil master sheet is slit into a desired breadth; hence an additional cutting step can be omitted, the transportation is easy and the productivity is improved, whereby the cost is reduced. Further, in the case where the stencil master sheet is broad, a plurality of cutters 17 and wind-up rolls corresponding thereto are provided, whereby it is possible to obtain a plurality of the stencil master sheets having different sizes, at the same time. Further, it is also possible to provide a means 18 for detecting defects on the sheet at the entrance of roll 12, for example. The means for detecting defects may be a conventional optical means which is provided with an appropriate marking means for marking the defects.

The present invention will be described in more detail by way of Example.

EXAMPLE

A laminated film composed of a EVA film as a base film and polyester films as thermoplastic films on both the surfaces thereof was prepared according to inflation co-extrusion molding, followed by subjecting the laminated film to biaxial stretching. A glycerine ester was added in 3% by weight into the base film. The thickness of the EVA film was $5\mu$ and that of the polyester films was $2\mu$. Porous substrates each composed of a mixed plain gauze consisting of hemp fibers and polyester fibers having a basis weight of 9 g/m² was adhered onto the respective thermoplastic films (polyester films) of the laminated film using urethane acrylate (UV rays-cured type adhesive) as an adhesive and in a quantity thereof coated of 0.9 g/m², followed by curing the resulting material using a curing apparatus (DHC-40K-3DB, a tradename of an apparatus manufactured by Nihon Denchi Company; output 80 W/cm) and at a linear velocity of 10 m/min. to thereby bond the porous substrates onto the thermoplastic films, and thereafter stripping the resulting thermal stencil master sheet from the base film along the boundary of the surfaces of the thermoplastic films. Any breakage was not observed in the thermoplastic films of the thus obtained thermal stencil master sheet. This stencil master sheet was set in an automatic stencil printing machine (RISOGRAPH 007 DIIIN, a tradename of an apparatus manufactured by Riso Kagaku Corporation) to carry out stencil-printing. As a result, a superior image was obtained with an impressed energy of 0.06 mj/1 dot. That is, the perforation properties were notably improved as compared with about 0.1 mj/1 dot which is a proper value of conventional stencil master sheets made of polyester films.

The above-mentioned Example is an embodiment of three layers in total of one base film and two thermoplastic films, but when base films of a two layer structure are used to form a laminated film of four layers in total, followed by bonding porous substrates thereto, stripping the resulting material between the base films of two layers and further stripping the thermal stencil master sheets from the respective base films, then it is also possible to produce products.

According to the present invention, since the thermoplastic films are supported by the base film, no breakage occurs in the thermoplastic films; further since the processing film is of a laminated film and has a large film thickness so that its handling in the production is easy, the yield of product is improved; still further since it is possible to form the thermal stencil master sheet on both the surfaces of the base film, the productivity is improved; furthermore since it is possible to form a very thin film of e.g. 2μ or less as the thermoplastic films, the resolving power at the time of stencil printing is improved and further the range of choice of film is broadened, for example it is possible to use even a film having a relatively low film strength.

Further, in the present invention, when a UV rays adhesive is used, no heat is applied at the time of curing; hence advantages are obtained such that problems of curling, etc. due to heat do not occur. Further, even when the impressed energy to thermal head is restricted to a low value, sufficient perforation properties are obtained; hence it is possible to reduce the impressed energy to thermal head so that it is possible to prolong the life of thermal head.

What we claim is:

1. A process for producing thermal stencil master sheets for stencil printing, comprising the steps of:
providing a flexible base film having a pair of opposed major surfaces;
laminating a thermoplastic film onto each of the major surfaces of said base film;
bonding a porous substrate onto each of said thermoplastic film; and
stripping from said base film both of said thermoplastic films and said porous substrates bonded thereto.

2. Process for producing a thermal stencil master sheet according to claim 1, wherein said thermoplastic film is made of at least one thermoplastic resin selected from polyesters, polycarbonates, polyethylene, polypropylene, polyamides, polyvinyl chloride, polyvinylidene chloride and vinylidene chloride-vinyl chloride copolymer.

3. Process for producing a thermal stencil master sheet according to claim 1, wherein said base film is made of at least one thermoplastic resin selected from polyesters, polycarbonates, polyethylene, polypropylene, polyamides, polyvinyl chloride, polyvinylidene chloride and vinylidene chloride-vinyl chloride copolymer.

4. Process for producing a thermal stencil master sheet according to claim 1, wherein the material of said base film is different from that of said thermoplastic film.

5. Process for producing a thermal stencil master sheet according to claim 1, wherein said base film contains 0.1 to 10% by weight of a release agent and has a thickness of 2 to 50 μm.

6. Process for producing a thermal stencil master sheet according to claim 5, wherein said release agent is selected from aliphatic hydrocarbons, higher aliphatic alcohols, fatty acids and esters thereof, metal soaps, and silicone release agents.

7. Process for producing a thermal stencil master sheet according to claim 1, wherein said porous substrate is made of thin paper, woven or non-woven fabric selected from manila hemp, paper mulberry, paper bush, pulp, polyester fibers, polyvinyl alcohol fibers or polyamide fibers, or screen plain gauzes of synthetic fibers or silk.

8. Process for producing a thermal stencil master sheet according to claim 1, wherein said laminating step is carried out by a co-extrusion molding method using an inflation die or T-die, or by a co-extrusion coating method.

9. A process for producing thermal stencil master sheets for stencil printing, comprising the steps of:
providing a flexible base film having a pair of opposed major surfaces;
laminating onto each of the major surfaces of said base film a thermoplastic film having a thickness of 0.5 to 10 μm;
bonding a porous substrate onto each of said thermoplastic films; and
stripping from said base film both of said thermoplastic films and said porous substrates bonded thereto.

10. A process for producing thermal stencil master sheets for stencil printing, comprising the steps of:
providing a flexible base film having a pair of opposed major surfaces and a thickness of 2 to 50 μm;
laminating onto each of the major surfaces of said base film a thermoplastic film having a thickness of 0.5 to 10 μm;
bonding a porous substrate onto each of said thermoplastic films; and
stripping from said base film both of said thermoplastic films and said porous substrates bonded thereto.

* * * * *